United States Patent

[11] 3,594,505

[72] Inventors David D. Price, Jr.
3429 Partridge, Oklahoma City, Okla. 73120;
Ford C. Price, 1909 NW 56 Terrace, Oklahoma City, Okla. 73118
[21] Appl. No. 668,627
[22] Filed Sept. 18, 1967
[45] Patented July 20, 1971

[54] INFORMATION DISTRIBUTION SYSTEM
2 Claims, 4 Drawing Figs.
[52] U.S. Cl. ................................................ 179/1 B, 35/35
[51] Int. Cl. ...................................................... G09b 19/06
[50] Field of Search........................................ 179/1.1, 100.1, 100.25; 35/35.3; 328/195, 198, 206; 324/73

[56]                    References Cited
              UNITED STATES PATENTS
2,824,961   2/1958   Paivinen.......................   250/27
3,222,597  12/1965   Beatenbough et al. .......   324/73
3,324,306   6/1967   Lockwood....................   328/206 X 3,405,461  10/1968   Joslow..........................   35/35
                    OTHER REFERENCES
INTRODUCTION TO THE LOGICAL DESIGN OF SWITCHING SYSTEMS; October, 1966, H. C. Torng; Pages 183—4.

Primary Examiner—Kathleen H. Claffy
Assistant Examiner—Jon Bradford Leaheey
Attorney—Dunlap, Laney, Hessin & Dougherty ABSTRACT: Apparatus for presenting information to a group in attention in a manner whereby the rate of information presentation is variable with respect to the group as a whole; the apparatus consists of a reproducing device for generating both an information signal and a control tone for distribution to a plurality of information-receiving stations. The distribution system provides for the reproduction of a series of predetermined amounts of information, each amount or serially occurring portion being terminated by a control tone which ceases reproduction and enables a listener response tally. Thereafter, each listener signifies readiness to continue by means of a switch closure, and after a predetermined number of such switch closures the reproducing device is restarted to generate the next segment of its information.

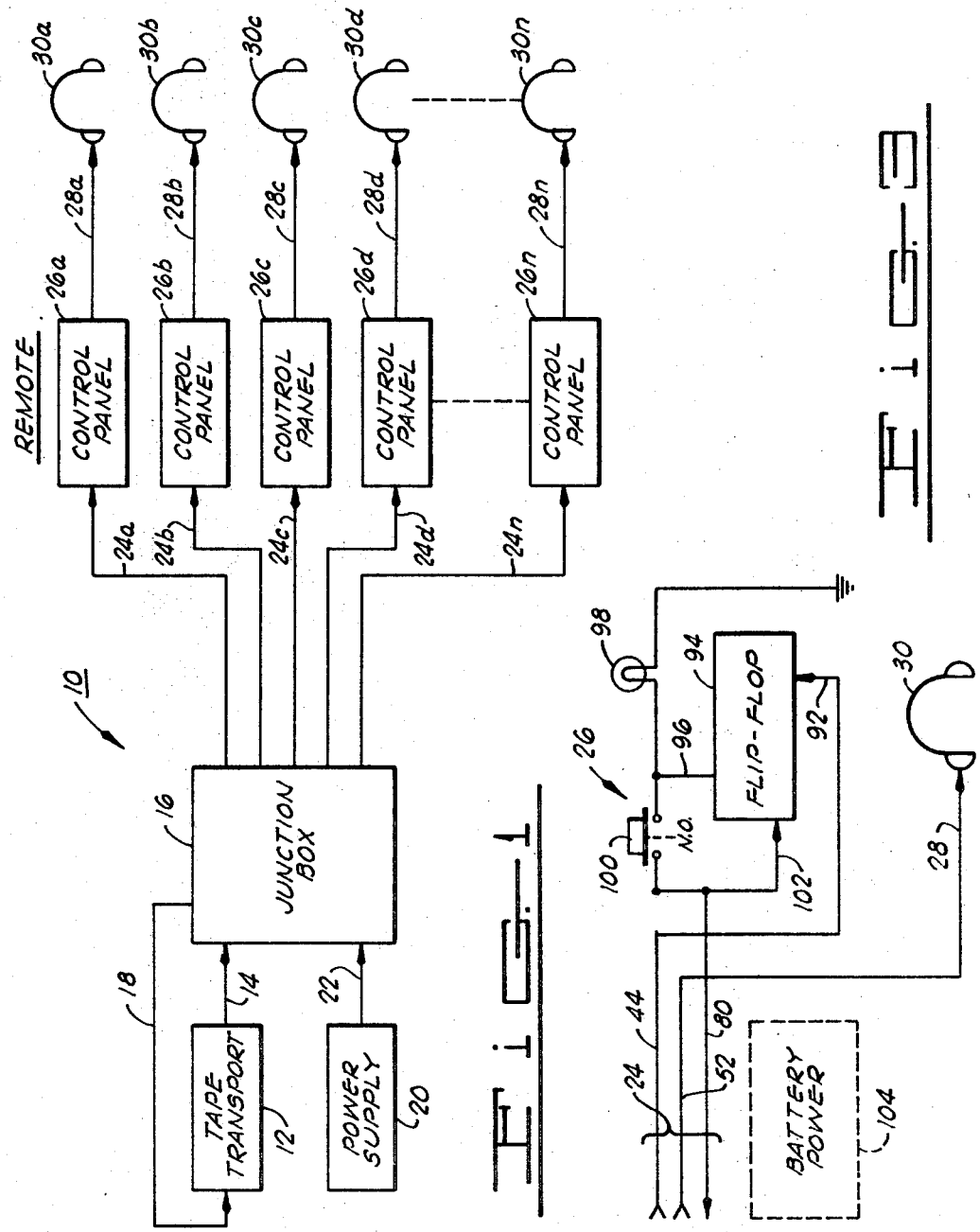

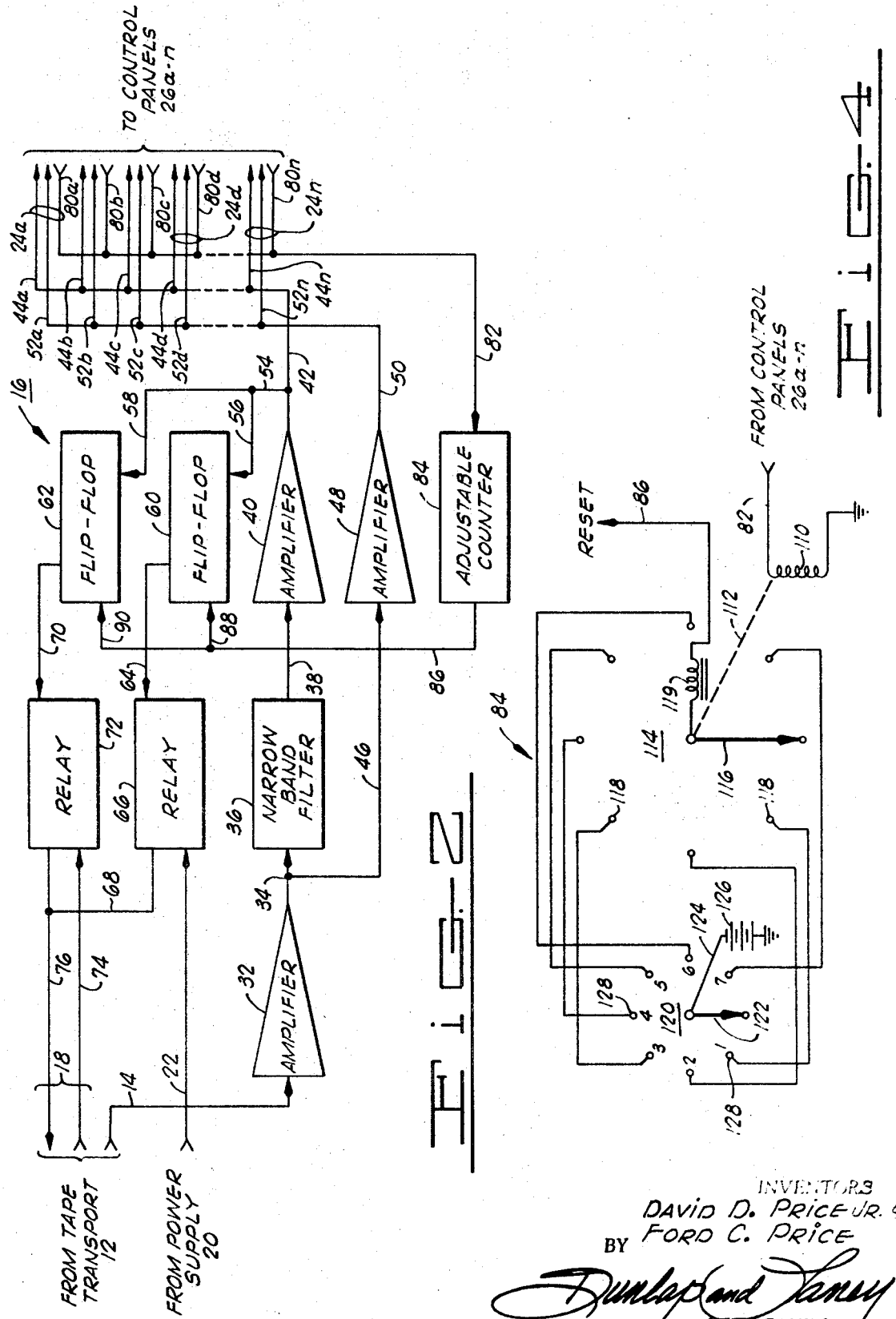

3,594,505

INFORMATION DISTRIBUTION SYSTEM

BACKGROUND OF THE INVENTION

Field of the Invention

The invention relates generally to information distribution networks and, more particularly, but not by way of limitation, it relates to improved audio presentation apparatus for supplying information to a plurality of subjects at a group-paced rate.

SUMMARY OF THE INVENTION

The present invention contemplates an audio distribution system which is capable of group-paced presentation of information to a plurality of subjects at a rate which is adjustable to best serve a purpose. In a more limited aspect, the invention consists of a reproducing assembly which utilizes an information record intersticed with unit demarcating control tone signals, the reproduced information and tone signal then being conducted through a central junction network to one or more listening and response stations. Each response station includes earphones, a response indicator, and a restarting switch, and the individual outputs from the plural restarting switches are then routed to an adjustable counter means which is activated upon receipt of a predetermined number of counts to restart the reproducing assembly thereby to enter the next cycle or phase of the information presentation procedure.

Therefore, it is an object of the present invention to provide an information presentation system which enables group-paced presentation of selected data to a plurality of subjects.

It is also an object of this invention to provide apparatus whereby the level of group comprehension which sets the criteria for the group-pacing rate is adjustable.

Finally, it is an object of the present invention to provide an information distribution system which can be utilized with existing audio teaching equipment to enable the additional advantages of group-pacing at predetermined rates as determined in accordance with subject matter complexity.

Other objects and advantages of the invention will be evident from the following detailed description when read in conjunction with the accompanying drawings which illustrate the invention.

BRIEF DESCRIPTION OF The DRAWINGS

FIG. 1 is a block diagram of the overall information distribution system;

FIG. 2 is a more detailed block diagram of one form of junction box employed in the invention as illustrated in FIG. 1;

FIG. 3 is a partial schematic diagram of a form of remote control panel which may be employed in the system of FIG. 1; and FIG. 4 is a schematic diagram of one form of adjustable counter which may be employed in the junction box of FIG 2.

DESCRIPTION OF THE PREFERRED EMBODIMENT

Referring to the drawings in detail, FIG. 1 depicts an information distribution system 10 which is capable of providing the group-pacing function in presenting information to a plurality of subjects. Distribution system 10 consists of a record playback unit, e.g. tape transport 12, which provides an output on lead 14 to a junction box 16. A control lead 18 leading from junction box 16 back to tape transport 12 provides control over the operation of tape transport 12 as will be further described. Additionally, a conventional type of power supply 20 is connected to junction box 16 via a cable 22 to supply various valves of AC and DC voltage to the circuitry of the distribution system 10.

The tape transport 12 may be any one of the various tape recorder and/or playback systems which are commercially available for general audio recording and playback usage. The tape transport 12 may include a remote control jack (not shown), in which case control input line 18 would be utilized to control playback of the tape transport 12. However, some other forms of tape player might require direct control over the line AC energizing voltage to control the tape transport movement and, in this event, control input on lead 18 might constitute an AC line input.

As previously stated, the tape transport 12 may be a standard type capable of reproducing recorded audio information from a conventional tape cartridge or reel at a usual record speed, for example, 15 inches per second. The record tape would consist of a plurality of successively recorded units or lengths of audio information each terminated by a burst of control tone signal. The control tone signal may consist of a short duration, constant frequency signal superimposed on or recorded immediately after each length of audio information signal. The present disclosure is directed towards a tape-type recorder mechanism; however, it should be understood that any of various types of recorder and record media may be employed in providing like function. That is, wire recorders, disc recorders, photoelectric recorders, and the like may be utilized to present the successive lengths of audio information and their interstitial control tone signals.

Audio information conducted to junction box 16 is then provided on a plurality of output cables 24 a, b, c, d through n for input to separate ones of a plurality of remote control panels 26 a, b, c, d through n. The audio information signal is then present on each of the output leads 28 a, b, c, d through n to the respective individual headsets or earphones 30 a, b, c, d through n. The number of control panels 26 and earphone sets 30 may be varied in accordance with the number of subjects utilizing the system.

FIG. 2 shows more detailed structure of the junction box 16 which receives information via lead 14 for input to an amplifier 32, and this provides the audio information signal and/or a control signal in amplified form at junction 34. This signal is passed through a narrow band filter 36 which is designed to match the selected control tone signal such that only the control tone signal is conducted on a lead 38 to amplifier 40. The amplified control tone signals are then conducted from amplifier 40 via output lead 42 to respective parallel leads 44a, b, c, d through n in each of cables 24 a—n leading to control panels 26 a—n Similarly, discriminated audio information signals at junction 34 are conducted via lead 46 for amplification in amplifier 48 and, thereafter, the output audio signal on lead 50 is applied through respective parallel leads 52 a, b, c, d through n of respective cables 24 a—n.

The amplifiers 32, 40 and 48 may be conventional forms of audio amplifier operated in usual configuration to give the greatest advantage as to audio fidelity and signal strength. The narrow band filter 36 may be any of various types, a primary consideration being that it provide tone signal selection without greatly interferring with the range or quality of the audio information signal. It could be performed in quite conventional manner compatible with any of the usable forms of audio record player that the control tone signal be designated at a frequency which is excessively high as compared to the desired audio signal frequency range. Such design would then alleviate any requirements for special or extra-sensitive filter components.

The control tone output on lead 42 is conducted via parallel leads 54 to the respective inputs 56 and 58 of flip-flop circuits 60 and 62. The flip-flops 60 and 62 may be similar types of bistable multivibrator of conventional design, each receiving leads 56 and 58 as an energizing input. Such flip-flop input may be designed to include diode-capacitor-diode gating or other such interlock input, such devices being common in the logic art. An output 64 of flip-flop 60 is connected to control a relay 66 which, in turn, effects a complete circuit between input lead 22 from power supply 20 and a lead 68 leading through line 18 to energize the tape transport 12. The flip-flop 62 can be energized to provide an output on a lead 70 to control a relay 72 so that it may effect a similar power application as between leads 74 and 76 (Cable 18) to energize tape transport 12.

Thus, depending upon the type of tape transport 12 which is available for inclusion in the information distribution system 10, two different transport energization circuits are available. For the case where the recorder motor is controlled directly in response to the AC line, flip-flop 60 can be energized to open relay 66 such that drive power from power supply 20 on lead 22 is interrupted and the tape transport 12 ceases output. In alternate cases where tape transport 12 may contain a remote relay control integral with its circuitry, a control tone signal on lead 54 will energize flip-flop 62 to provide output via lead 70 to open relay 72 such that the remote relay control is actuated and tape drive energization is removed.

A third group of parallel leads 80 a, b, c, d through n lead from respective control panels 26 a—n and cables 24 a—n to an input lead 82 into an adjustable counter 84. The adjustable counter 84 serves to receive student-actuated signals via input 82 and, upon receiving a predetermine number of such input signals, to provide an output on lead 86 to the respective reset inputs 88 and 90 of flip-flops 60 an 62. This reset occurs after a predetermined group count such that each of flip-flops 60 and 62 assume a conduction which activates relays 66 and 72 to complete their respective circuits and thereby provide drive energization to tape transport 12. There are various forms of conventional counter which may be employed as the adjustable counter 84 as will be further described below.

The schematic diagram of FIG. 3 shows one of the remote control panels 26 and its associated earphone set 30 in greater detail. Thus, input via lead 52 is applied directly to the lead 28 for reproduction through earphones 30. Control tone signal on lead 44 is applied to an input 92 of a flip-flop circuit 94. Here again, flip-flop circuit 94 may be a conventional form of bistable multivibrator providing a stable output on lead 96 which is indicative of a desired condition or conduction state. The output 96 is connected through an indicator lamp 98 to ground as well as through a pushbutton switch 100 of normally open configuration for application to the reset input 102. The reset output from pushbutton switch 100 is also conducted via lead 80 for application to input lead 82 to the count circuit 84 (FIG. 2).

The remote control panels 26 may be contained in a convenient form of portable instrument casing or such (not shown); and it may contain its own power, as indicated generally by battery power 104 shown in dashed line, or it may receive energizing power through the cable 24 via additional leads now shown. It should be understood that various forms of earphones 30 and/or even speaker-type reproducing components may be employed.

FIG. 4 shows one form of adjustable counter 84 which may be employed in the junction box 16 (FIG. 2). The adjustable counter 84 receives an input on lead 82 from parallel leads 80 a—n and respective control panels 26 a—n. The input on lead 82 is connected through a stepping coil 110 which is then connected on ground or common. The stepping coil 110 is magnetomechanically connected as by dash line 112 to actuate stepping switch 114. Stepping switch 114 consists of a rotary or wiper contact 116 which is connected to the output lead 86 and which can be actuated a step at a time around to successive ones of the plurality of contacts 118. Coil 119 serves to return contact 116 to the zero or start position as shown. Such electromagnetically operated, ratchet action rotary switches as switch 114 are well-known in the art.

A manually adjustable switch 120 has its rotary or wiper contact 122 connected via lead 124 to a suitable power source such as battery 126. A plurality of circularly arrayed contacts 128 are then connected to respective ones of the circularly arrayed contacts 118 of switch 114 such that selective manual positioning of wiper 122 applies power from battery 126 to one of contacts 128 which, in turn, places the power on the respective circular contact 118. Thus, a predetermined number of count inputs to switch 114 can be required prior to reset output on lead 86 by the manually selected position of switch 120.

There are various other forms of adjustable counter mechanism or circuit which may be employed; however, from the standpoint of simplicity and reliability, the FIG. 4 device constitutes an advantageous selection. An output on lead 86, obtained after a predetermined number of count inputs on lead 82, is applied to reset inputs 88 and 90 to place flip-flops 60 and 62 in a conduction state whereby output on respective leads 64 and 70 activate the relays 66 and 72 (or a single one of the same) to apply tape drive energization and start the next segment of recorded information dissemination.

OPERATION

The tape transport 12 may utilize an audio record having a series of units or lengths of audio information recorded thereon, each length being terminated by a control signal in the form of a constant frequency tone. A number of remote control panels 26 a—n may be connected into the distribution system 10, this depending upon the number of individual subjects or students which engage in the particular information dissemination procedure. The number of participants will figure further in the setting of adjustable counter 84 (FIG. 2) to obtain a desired group-pacing rate.

A unit or length of audio information may require each student to make a written or oral answer or some such time-consuming consideration of the delivered information, and time lags for consideration as between the bright or quick minds and the more deliberate thinkers will vary by a great amount. Effective group-pacing can be catalyzed by gearing information reception and response time of an entire group to a selected portion of that group, whether it includes only the quickest minds or a majority of the group at a somewhat slower pace. Thus, each of the remote control panels 26 (FIG. 3) includes a pushbutton 100 which the subject may energize to deliver a consideration completed indication to the junction box 16, and each of these consideration completed indications is received by adjustable counter 84 (FIG. 4) in junction box 16 to enable an output after a predetermined count to energize the tape recorder for presentation of the next segment of information. Not all information units need require a time-consuming consideration; however, the overall effect as derived from presentation of a series of information units, some requiring written or oral considerations, is that a group-paced procedure take place.

Thus, an information unit is reproduced form tape transport 12 and supplied through amplifier 32, lead 46 and amplifier 48 for conduction through cables 24 a—n to the remote control panels 26 a—n whereupon each of the subjects hears the information through earphones 30 a—n. At the end of the length of information, a control tone signal is reproduced and it appears on lead 14 through amplifier 32 at junction 34 whereupon narrow and filter 36 conducts the control tone through amplifier 40 to output lead 42 and parallel cables 24 a—n. First, the control tone present on lead 42 is supplied to energize flip-flop circuits 60 and 62 to their other conductive states whereupon relays 66 and 72 are activated to remove tape drive from tape transport 12. In addition, the control tone output on lead 42 is conducted through each of the parallel leads 44 a—n to remote control panels 26 a—n (FIG. 3) where it serves to indicate response readiness and to enable the students response actuation after due consideration. That is, and referring to FIG. 3, the control input on lead 44 places flip-flop circuit 94 in its opposite conductivity state whereby the lamp 98 is illuminated, this denotes the end of a unit or length of information and the requirement of the subjects response. After such consideration as is required, the subject indicates consideration completion by depression of pushbutton switch 100 which resets the flip-flop circuit 94 and places remote control panel 26 in readiness for the next response sequence. The pushbutton switch 100 also provides output via leads 80 and 82 for input to the adjustable counter 84 (FIG. 2) thereby to make its individual contribution to the group-pacing count.

As shown in FIG. 4, the adjustable counter 84 receives student-actuated inputs via 82, each one energizing the stepping coil 110, to rotate the wiper element 116 of stepping switch 114. In the case as illustrated, the stepping switch 114 is shown in its zero count position with seven additional count steps available in its rotary movement. The actual count whereupon recycling or reset output occurs is selected in accordance with desired group-pacing. For example, the manual selector switch 120 could be set on position three so that three input pulses on lead 82 would provide an output reset pulse on lead 86 to restart the system. This would be the equivalent of requiring the entire group of subjects to at least attempt to respond to the disseminated information at a rate equivalent to that of an average third subject of the group.

Upon fulfilling the required response count, the adjustable counter 84 will provide an output on lead 86 to reset the respective flip-flops 60 and 62 such that their outputs once again cause relays 66 and 72 to apply tape drive to the tape transport 12. The next unit or length of information is then played back for group consideration and whatever the response.

The foregoing describes a novel information distribution system which allows a given body of information to be presented to the group at a selected comprehension rate which can be equated to the group as a whole. Thus, the distribution system becomes a very useful tool in the teaching and testing arts as it provides a very flexible test apparatus which can be employed to indicate various factors pertaining to groups or their individuals. The apparatus is of relatively simple structure which can be employed to include much existing equipment and which is extremely reliable in operation.

Changes may be made in combination and arrangement of elements as heretofore set forth in this specification and shown in the drawings; it being understood that change may be made in the embodiments disposed without departing from the spirit and scope of the invention as defined in the following claims.

What We claim is:

1. Information distribution apparatus, comprising:
playback means energized to generate an audio output consisting of audio information signal intersticed with periodic control tone signals;
first means for separating said audio output into an information signal output and a tone signal output;
second means having first and second inputs receiving said tone signal output at a first input to deenergize said playback means;
plural remote means each receiving said information signal output and said tone signal output;
plural audio presentation means each connected to one of said remote means to receive said information signal from said remote means;
plural bistable control means each being integral with one of said remote means and each consisting of flip-flop circuit means energized to one state upon receiving said tone control signal, and including indicator means energized by said flip-flop circuit means when in said one state;
plural switch means each of which consists of pushbutton switch means which completes a reset circuit from said flip-flop circuit means output in its one state to reset said flip-flop circuit means to the other state; and
stepping switch means actuated by a reset output from one of said bistable control means and providing an output signal after a selected number of said reset outputs thereby to activate said second means to energize said playback means.

2. Information distribution apparatus as set forth in claim 1 wherein said audio presentation means comprises:
an earphone headset.